US006490316B1

(12) United States Patent
Motegi et al.

(10) Patent No.: US 6,490,316 B1
(45) Date of Patent: Dec. 3, 2002

(54) CORRELATION DETECTION APPARATUS AND CDMA RECEIVING APPARATUS

(75) Inventors: Isao Motegi, Yokosuka (JP); Hiroki Shinde, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/352,114

(22) Filed: Jul. 13, 1999

(30) Foreign Application Priority Data

Jul. 16, 1998 (JP) .......................................... 10-202368

(51) Int. Cl.[7] .............................. H04B 1/69; H04L 27/06
(52) U.S. Cl. ........................................ 375/150; 375/343
(58) Field of Search ................................ 375/150, 367, 375/343, 152, 142, 130; 708/314, 422

(56) References Cited

U.S. PATENT DOCUMENTS

| 6,064,690 A | * | 5/2000 | Zhou et al. ................... 370/342 |
| 6,069,915 A | * | 5/2000 | Hulbert ........................ 370/517 |
| 6,393,046 B1 | * | 5/2002 | Kohli et al. ................. 375/130 |

FOREIGN PATENT DOCUMENTS

| JP | 6-235762 | 8/1994 |
| JP | 9-55685 | 2/1997 |
| JP | 9-247044 | 9/1997 |
| JP | 9-321660 | 12/1997 |
| JP | 10-173485 | 6/1998 |
| JP | 10-178334 | 6/1998 |
| JP | 10-178368 | 6/1998 |

OTHER PUBLICATIONS

English Language Abstract of JP 6–235762.
English Language Abstract of JP 10–173485.
English Language Abstract of JP 10–178368.
English Language Abstract of JP 10–178334.
English Language Abstract of JP 9–247044.
English Language Abstract of JP 9–55685.
English Language Abstract of JP 9–321660.

* cited by examiner

Primary Examiner—Chi Pham
Assistant Examiner—Khai Tran
(74) Attorney, Agent, or Firm—Greenblum & Bernstein, P.L.C.

(57) ABSTRACT

An apparatus for obtaining correlation by despreading a spread symbol with a spreading code is provided with a symbol storage section for storing symbol and a plurality of correlation calculators each of which executes a correlation calculation to obtain correlation by despreading the symbol data with a spreading code. The apparatus switches a spreading code to be provided to each of the plurality of correlation calculators individually so that each of the plurality of correlation calculators executes correlation calculation with a respective different spreading code and holds a same spreading code until correlation calculations of a plurality of symbols are finished.

9 Claims, 16 Drawing Sheets

FIG. 4

| | DESPREADING CODE STORAGE CIRCUIT OF FIRST AND-OR CIRCULATOR 101 | DESPREADING CODE STORAGE CIRCUIT OF SECOND AND-OR CIRCULATOR 102 | DESPREADING CODE STORAGE CIRCUIT OF THIRD AND-OR CIRCULATOR 103 | DESPREADING CODE STORAGE CIRCUIT OF FOURTH AND-OR CIRCULATOR 104 |
|---|---|---|---|---|
| TIME T1 | PERIOD T1 | FIRST DESPREADING CODE SEQUENCE | — | — | — |
| TIME T2 | PERIOD T2 | FIRST DESPREADING CODE SEQUENCE | SECOND DESPREADING CODE SEQUENCE | — | — |
| TIME T3 | PERIOD T3 | FIRST DESPREADING CODE SEQUENCE | SECOND DESPREADING CODE SEQUENCE | THIRD DESPREADING CODE SEQUENCE | — |
| TIME T4 | PERIOD T4 | FIRST DESPREADING CODE SEQUENCE | SECOND DESPREADING CODE SEQUENCE | THIRD DESPREADING CODE SEQUENCE | FOURTH DESPREADING CODE SEQUENCE |
| TIME T5 | PERIOD T5 | FIFTH DESPREADING CODE SEQUENCE | SECOND DESPREADING CODE SEQUENCE | THIRD DESPREADING CODE SEQUENCE | FOURTH DESPREADING CODE SEQUENCE |
| TIME T6 | PERIOD T6 | FIFTH DESPREADING CODE SEQUENCE | SIXTH DESPREADING CODE SEQUENCE | THIRD DESPREADING CODE SEQUENCE | FOURTH DESPREADING CODE SEQUENCE |
| TIME T7 | PERIOD T7 | FIFTH DESPREADING CODE SEQUENCE | SIXTH DESPREADING CODE SEQUENCE | SEVENTH DESPREADING CODE SEQUENCE | FOURTH DESPREADING CODE SEQUENCE |
| TIME T8 | PERIOD T8 | FIFTH DESPREADING CODE SEQUENCE | SIXTH DESPREADING CODE SEQUENCE | SEVENTH DESPREADING CODE SEQUENCE | EIGHTH DESPREADING CODE SEQUENCE |
| TIME T9 | PERIOD T9 | NINTH DESPREADING CODE SEQUENCE | SIXTH DESPREADING CODE SEQUENCE | SEVENTH DESPREADING CODE SEQUENCE | EIGHTH DESPREADING CODE SEQUENCE |
| TIME T10 | PERIOD T10 | NINTH DESPREADING CODE SEQUENCE | TENTH DESPREADING CODE SEQUENCE | SEVENTH DESPREADING CODE SEQUENCE | EIGHTH DESPREADING CODE SEQUENCE |
| TIME T11 | PERIOD T11 | NINTH DESPREADING CODE SEQUENCE | TENTH DESPREADING CODE SEQUENCE | ELEVENTH DESPREADING CODE SEQUENCE | EIGHTH DESPREADING CODE SEQUENCE |

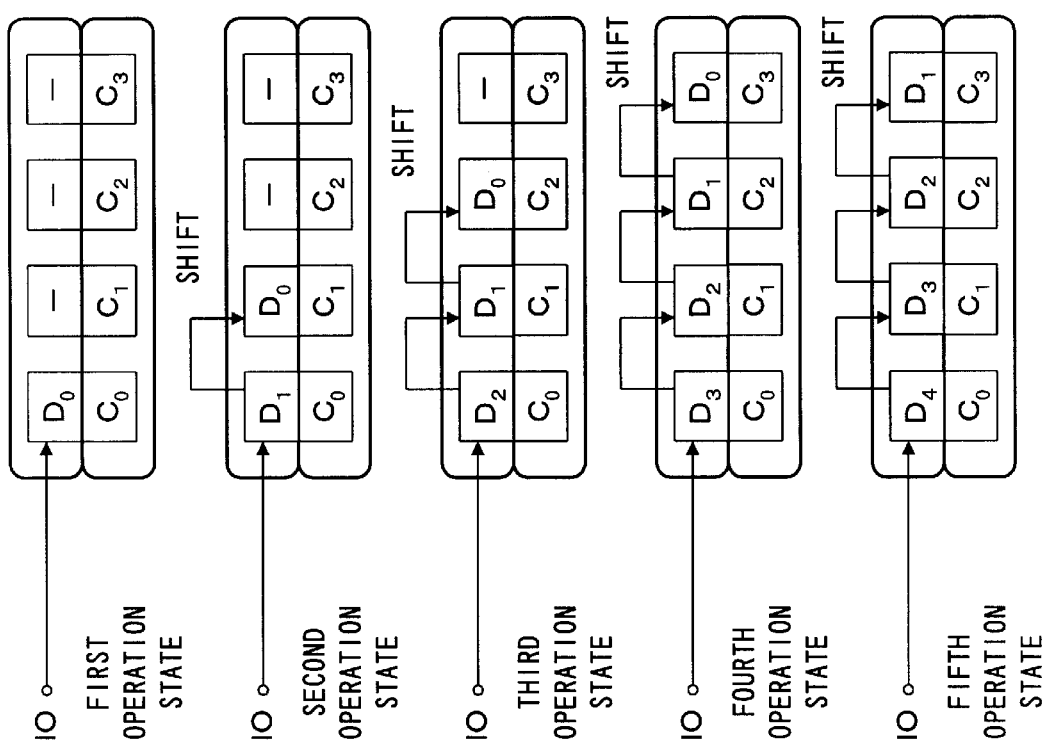

CORRELATION DETECTION APPARATUS AND CDMA RECEIVING APPARATUS

BACKGROUND OF THE INVENTION

1. Field of the Invention

The present invention relates to a correlation detection apparatus used in detecting the correlation of a spread spectrum signal in a CDMA (Code Division Multiple Access) radio communication apparatus, and more particularly, to a correlation detection apparatus applicable to a digital matched filter.

2. Related Art

A matched filter is used at a receiving station to demodulate a spread spectrum signal that is generated by multiplying transmission data with a spreading code at a transmitting station.

FIG. 1 illustrates an example of a configuration of a conventional matched filter. The matched filter illustrated in FIG. 1 is a digital matched filter with 4 taps for spreading ratio 4 composed of FIR digital filters.

Digital signal IO is input to signal input terminal 1 of the digital matched filter. Digital signal IO is, for example, a digital signal generated by sampling a spread spectrum signal at a sampling frequency of 4,096 MHz. This digital signal IO is input to first flip-flop group 11 of shift register with taps 10 (hereinafter referred to as shift register 10), and then shifted sequentially to fourth flip-flop group 14 from first flip-flop group 11 in synchronization with clock CLK of 4,096 MHz input to clock input terminal 2.

Output Signals output from every tap and the flip-flop at the last stage of shift register 10 are respectively input to first to fourth multipliers 15 to 18. Corresponding despreading code C among from despreading code sequence C3C2C1C0 is provided to each of first to fourth multipliers 15 to 18. Accordingly, first multiplier 15 executes multiplication of an output signal from first flip-flop group 11 by despreading code Co (1 bit). Similarly, second to fourth multipliers 16 to 18 execute respectively multiplication of output signals from second to fourth flip-flop groups 12 to 14 respectively by despreading codes C1 to C3. First to fourth multiplies 15 to 18 respectively execute multiplication of respective output signals from first to fourth flip-flop groups by 1 when the despreading code indicates 0, and multiplication of output signals from first to fourth flip-flop groups by −1 when the despreading code indicates 1.

First adder 19 adds outputs from first and second multipliers 15 and 16, second adder 20 adds outputs from third and fourth adders 17 and 18, and third multipliers 21 adds outputs from first and second adders 19 and 20. As a result, correlation value MFOUT of digital signal IO with despreading code sequence C3C2C1C0 is output to external through output terminal 3.

Conventionally, the digital matched filter described above rewrites despreading code sequence C3C2C1C0 on a basis of one symbol period to detect the correlation of each symbol. As a result, it is not possible to detect the correlation of delayed waves input after one symbol period passes.

Such a condition has remained the inconveniences that it is not possible to effectively utilize delayed waves input after one symbol period passes in the CDMA system that enables a plurality of delayed waves to be utilized. One of means of solving the inconveniences suggests a configuration having a plurality of parallel connected matched filters each of which is illustrated in FIG. 1. FIG. 2 illustrates the configuration having a plurality of parallel connected matched filters each of which is illustrated in FIG. 1. First to fourth digital matched filters M1 to M4 are provided in parallel.

However, the configuration with the plurality of parallel connected matched filters results in the problem that a circuit scale and power consumption are increased.

SUMMARY OF THE INVENTION

An object of the present invention is to provide a correlation detection apparatus capable of detecting the correlation of delayed waves arriving after one symbol period passes, and of decreasing a circuit scale and power consumption.

The correlation detection apparatus has a data storage section for storing symbol data, a plurality of correlation calculators connected to the data storage section in parallel, each for executing the correlation detection of the symbol data with a spreading code for despreading, and a code controller for rewriting the spreading code for each of the correlation calculators on a basis of a plurality of symbol periods individually.

According to the configuration, a plurality of correlation calculators are connected to the data storage section in parallel, and the spreading codes in respective correlation calculators are individually rewritten after a period corresponding to a plurality of symbols passes. Therefore, it is possible to detect the correlation of delayed waves arriving after one symbol period passes, and to decrease a circuit scale and power consumption largely compared with the case of arranging a plurality of digital matched filters in parallel to perform the processing.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 4 is a state diagram to explain a procedure of multiplication in the digital matched filter according the first embodiment;

FIG. 5 is a diagram illustrating a rewrite pattern of despreading code sequences in the digital matched filter according to the first embodiment;

DETAILED DESCRIPTION OF THE PREFERRED EMBODIMENTS

Embodiments of the present invention will be described in detail in the following with reference to accompanying drawings.

(First Embodiment)

Figure 3:
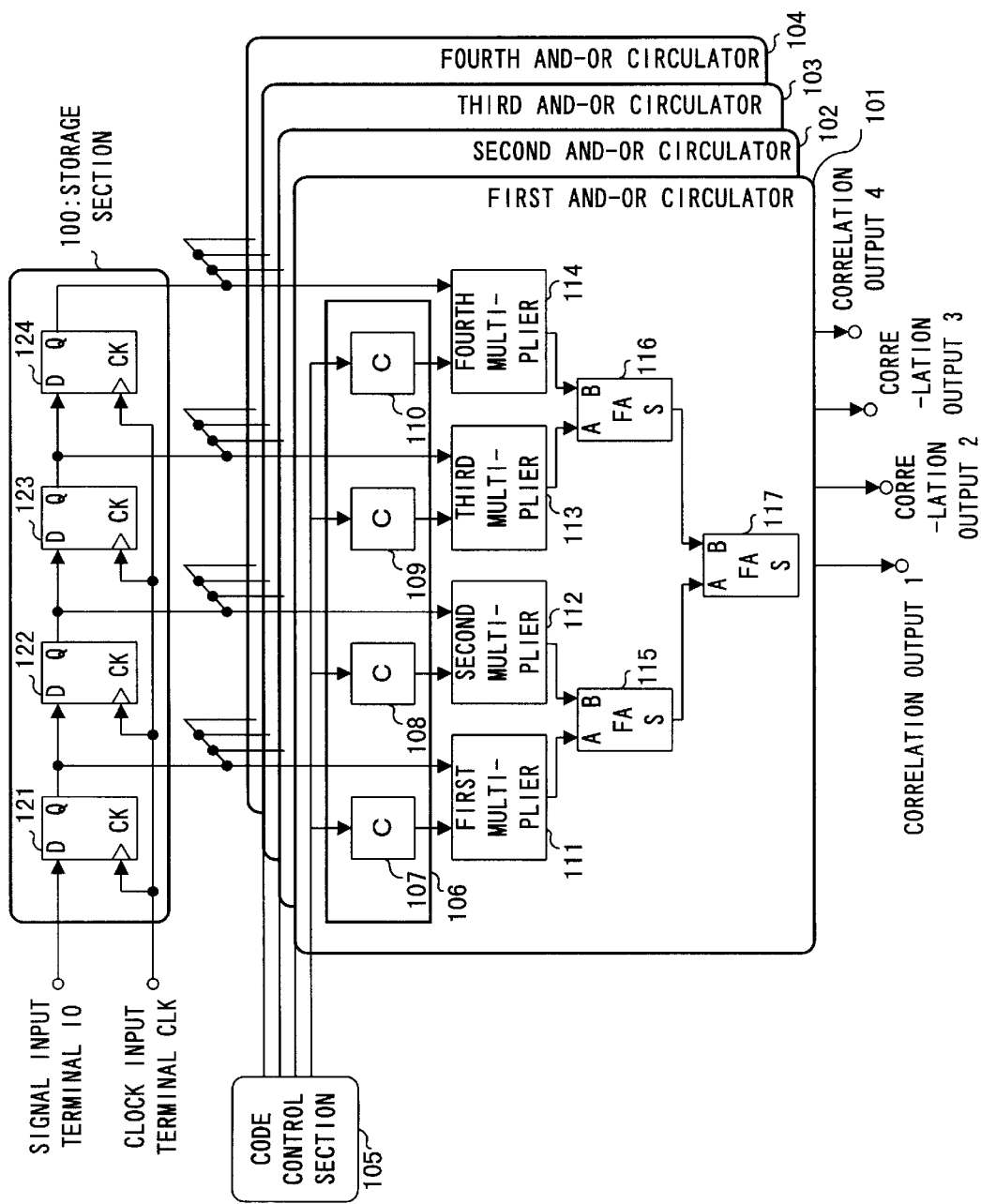
FIG. 3 is a block diagram of a digital matched filter according to a first embodiment of the present invention.

FIG. 3 illustrates a configuration diagram of a digital matched filter for spreading factor 4 composed of FIR digital filters according to the first embodiment of the present invention. The digital matched filter illustrated in FIG. 3 has storage section 100 to which digital signal IO generated by sampling a spread spectrum signal is input, first to fourth AND-OR circulators 101 to 104 corresponding to the number of waiting delay waves and code control section 105.

In storage section 100, first to fourth flip-flops 121 to 124 are serially connected with taps provided at output stages of respective flip-flops 121 to 124. Input terminal D of first flip-flop 121 is connected to a signal input terminal to which digital signal IO, which is data to be subjected to correlation detection, is input. Clock CLK, common to all flip-flop groups, is input to a clock input terminal of each flip-flop group.

First AND-OR circulator 101 has despreading code storage circuit 106 for holding the same despreading code over a plurality of symbols period as illustrated in FIG. 3, first to fourth multipliers 111 to 114 each for multiplying a despreading code held in despreading code storage circuit 106 by digital data output from storage section 100 concurrently, and first to third adders 115 to 117 for adding outputs from first to fourth multipliers 111 to 114. Despreading code storage circuit 106 is composed of first to fourth flip-flops 107 to 110 to which code control section 105 writes despreading codes. The other AND-OR circulators 102 to 104 have the same configurations as first AND-OR circulator 101.

Code control section 105 controls despreading codes so that the state of despreading codes to be loaded to despreading code storage circuits 106 at first to fourth AND-OR circulators 101 to 104 is formed as illustrated in FIG. 4. In other words, code control section 106 controls so that a despreading code is loaded to respective despreading code storage circuits 106 at first to fourth AND-OR circulators 101 to 104 in this order sequentially every one symbol period, while the same despreading code is held at respective despreading code storage circuits 106 over a four symbol periods.

Operations in the digital matched filter according to this embodiment configured as described above will be described.

Digital signal IO is input to the signal input terminal of storage section 100. Digital signal IO is generated by sampling a spread spectrum signal at a sampling frequency of 4,096 MHz, and is a digital signal of N bits presented by 2 complement synchronized with clock CLK of 4,096 MHz which is input to the clock input terminal.

Digital signal IO is input to data input terminal D of first to fourth flip-flops 121 to 124 composing storage section 100. According to the aforementioned processing, since "1" (high level in logical value) is input sequentially to clock input terminals CK of first to fourth flip-flops 121 to 124 composing storage section 100 in synchronization with clock CLK, digital signal IO is input to first to fourth flip-flops 121 to 124, in synchronization with clock CLK, to be held.

Despreading codes generated by code control section 105 are stored in first to fourth flip-flops composing first despreading code storage circuit 106 at first AND-OR circulator 101.

First to fourth multipliers 115 to 117 respectively multiply output signals (N bits) from first to fourth flip-flops 121 to 124 by first to fourth despreading codes (1 bit). In addition, multipliers 111 to 114 respectively multiply output signals from first to fourth flip-flops 121 to 124 by −1 when the despreading code indicates 1, while multiply output signals from first to fourth flip-flops 121 to 124 by 1 when the despreading code indicates 0.

The following description is given of producers of multiplication in each of multipliers 111 to 114 and procedures of addition in each of adders 115 to 117 with reference to FIG. 5.

In the first operation state, first sampling data D0 of digital signal IO is input to the signal input terminal in synchronization with clock CLK, while "1" is input to first clock input terminal CK at storage section 100, and first sampling data D0 is input to flip-flop 121 with first tap to be held. As a result, first multiplier 111 multiplies first sampling data D0 by despreading code C0 held in first despreading code flip-flop 107 at the initial state by code control section 105. Accordingly, an output signal indicative of D0×C0 is output from first multiplier 111.

In the second operation state, second sampling data D1 of digital signal IO is input to the signal input terminal in synchronization with clock CLK, while first sampling D0 is shifted to flip-flop 122 with second tap at storage section 100. As a result, second multiplier 112 multiplies first sampling data D0 by despreading code C1 held in second despreading code flip-flop 108 at the initial state by code control section 105, and first multiplier 111 multiplies second sampling data D1 by despreading code C0. Accordingly, an output signal indicative of D0×C1 is output from second multiplier 112, and an output signal indicative of D1×C0 is output from first multiplier 111.

In the third operation state, third sampling data D2 of digital signal IO is input to the signal input terminal in synchronization with CLK, while in synchronization with clock CLK, first sampling Do is shifted to flip-flop 123 with third tap at storage section 100, second sampling data D1 is shifted to flip-flop 122 with second tap at storage section 100, and third sampling data D2 is shifted to flip-flop 121 with first tap at storage section 100. At this stage, third multiplier 113 multiplies first sampling data D0 by despreading code C2 held in third despreading code flip-flop 109 at the initial state by code control section 105, second multiplier 112 multiplies the second sampling data D1 by despreading code C1 held in second despreading code flip-flop 108, and first multiplier 111 multiplies third sampling data D2 by despreading code C0 held in first despreading code flip-flop 107. Accordingly, an output signal indicative of D0×C2 is output from third multiplier 113, an output signal indicative of D1×C1 is output from second multiplier 112, and an output signal indicative of D2×C0 is output from first multiplier 111.

In the fourth operation state, fourth sampling data D3 of digital signal IO is input to the signal input terminal in synchronization with clock CLK, while in synchronization with clock CLK, first sampling D0 is shifted to flip-flop 124 with fourth tap at storage section 100, second sampling data D1 is shifted to flip-flop 123 with third tap at storage section 100, and third sampling data D2 is shifted to flip-flop 122 with second tap at storage section 100, fourth sampling data D3 is shifted to flip-flop 121 with first tap at storage section 100.

At this stage, fourth multiplier 114 multiplies first sampling data D0 by despreading code C3 held in fourth despreading code flip-flop 110 at the initial state by code control section 105, third multiplier 113 multiplies second sampling data D1 by despreading code C2 held in third despreading code flip-flop 109, second multiplier 112 multiplies the third sampling data D2 by despreading code C1 held in second despreading code flip-flop 108, and first multiplier 111 multiplies fourth sampling data D3 by despreading code C0 held in first despreading code flip-flop 107. As a result, an output signal indicative of D0×C3 is output from fourth multiplier 114, an output signal indicative of D1×C2 is output from third multiplier 113, an output signal indicative of D2×C1 is output from second multiplier 112, and an output signal indicative of D3×C0 is output from first multiplier 111.

The aforementioned processing results in all multiplication which is needed to obtain the correlation of first four sampling data of digital signal IO, i.e., D1D2D3D4 with despreading code C3C2C1C0.

In the fifth operation state, fifth sampling data D4 of digital signal IO is input to the signal input terminal in synchronization with clock CLK, while in synchronization with clock CLK, second sampling D1 is shifted to flip-flop 124 with fourth tap at storage section 100, third sampling data D2 is shifted to flip-flop 123 with third tap at storage section 100, fourth sampling data D3 is shifted to flip-flop 122 with second tap at storage section 100, and fifth sampling data D4 is shifted to flip-flop 121 with first tap at storage section 100.

At this stage, fourth multiplier 114 multiplies second sampling data D1 by despreading code C3 held in fourth despreading code flip-flop 110 at the initial state by code control section 105, third multiplier 113 multiplies third sampling data D2 by despreading code C2 held in third despreading code flip-flop 109, second multiplier 112 multiplies fourth sampling data D3 by despreading code C1 held in second despreading code flip-flop 108, and first multiplier 111 multiplies fifth sampling data D4 by despreading code C0 held in first despreading code flip-flop 107. As a result, an output signal indicative of D1×C3 is output from fourth multiplier 114, an output signal indicative of D2×C2 is output from third multiplier 113, an output signal indicative of D3×C1 is output from second multiplier 112, and an output signal indicative of D4×C0 is output from first multiplier 111.

First and second adders 115 and 116 add N bits to N bits and output an output signal of N+1 bits. Third adder 117 adds N+1 bits to N+1 bits and output an output signal of N+2 bits. First adder 115 adds the output signal (N bits) from first multiplier 111 to the output signal (N bits) from second multiplier 112. Second adder 116 adds the output signal (N bits) from third multiplier 113 to the output signal (N bits) from fourth multiplier 114. Third adder 117 adds the output signal (N+1 bits) from first adder 115 to the output signal (N+1 bits) from second adder 116. As a result, the correlation value MFOUT of digital signal IO with despreading code C3C2C1C0 is obtained at third adder 117 and output to the external.

Similarly, second to fourth AND-OR circulators 102 to 104 execute the same processing as the first AND-OR circulator 101. The same processing is repeated after that.

Code control section 105 switches between despreading codes to be loaded to first to fourth AND-OR circulators 101 to 104 as illustrated in FIG. 4, so that the multiplication is executed to obtain the correlation value of data (delayed wave), which is sampled after first four sampling data D3D2D1D0 (corresponding to one symbol) of digital signal IO, with the same despreading code as D3D2D1D0.

The switching control of despreading code in code control section 105 will be described in detail with reference to FIG. 4.

Code control section 105 stores despreading code C13C12C11C10 in despreading code storage circuit 106 at first AND-OR circulator 101 at the initial state (time T1) in FIG. 4 to obtain the correlation of first symbol S0, and after one symbol period (4×clock CLK) passes (time T2), stores next despreading code C23C22C21C20 in despreading code storage circuit 106 at second AND-OR circulator 102 to obtain the correlation of second symbol S1. At this stage, despreading code C13C12C11C10 is still held in despreading code storage circuit 106 at first AND-OR circulator 101 to obtain the correlation of delayed wave of first symbol S0 input during period T2. After one symbol period further passes (at time T3), code control section 105 stores next despreading code C33C32C31C30 in despreading code storage circuit 106 at third AND-OR circulator 103 to obtain the correlation of third symbol S2. At this stage, despreading code C13C12C11C10 is still held in despreading code storage circuit 106 at first AND-OR circulator 101 to obtain the correlation of delayed wave of first symbol S0 input during period T3, and despreading code C23C22C21C20 is also held in despreading code storage circuit 106 at second AND-OR circulator 102 to obtain the correlation of delayed version of second symbol S1 input during period T3. After one symbol duration further passes (at time T4), code control section 105 stores next despreading code C43C42C41C40 in despreading code storage circuit 106 at fourth AND-OR circulator 104 to obtain the correlation of fourth symbol S3. At this stage, despreading code C13C12C11C10 is still held in despreading code storage circuit 106 at first AND-OR circulator 101 to obtain the correlation of delayed wave of first symbol S0 input during period T4, despreading code C23C22C21C20 is also held in despreading code storage circuit 106 at second AND-OR circulator 102 to obtain the correlation of delayed wave of second symbol S1 input during period T4, and despreading code C33C32C31C30 is also held in despreading code storage circuit 106 at third AND-OR circulator 103 to obtain the correlation of delayed wave of third symbol S2 input during period T4.

According to this embodiment, since four AND-OR circulators 101 to 104 are provided in parallel to execute despreading calculation and code control section 105 controls to hold despreading codes provided to AND-OR calculators 101 to 104 over four symbol periods, it is possible to process main and delayed waves with the same despreading code over four symbol periods (16×clock CLK), resulting in reliable correlation detection.

(Second Embodiment)

A digital matched filter according to the second embodiment has, as well as the first embodiment, a storage section in which digital signal IO to be subjected to correlation detection is held, first to fourth AND-OR circulators enabling despreading calculation of four symbols to be executed in parallel, and a code control section which controls switching between despreading codes set in each AND-OR circulator. The configuration of the storage section and AND-OR circulators are partially same as the first embodiment.

Figure 6:
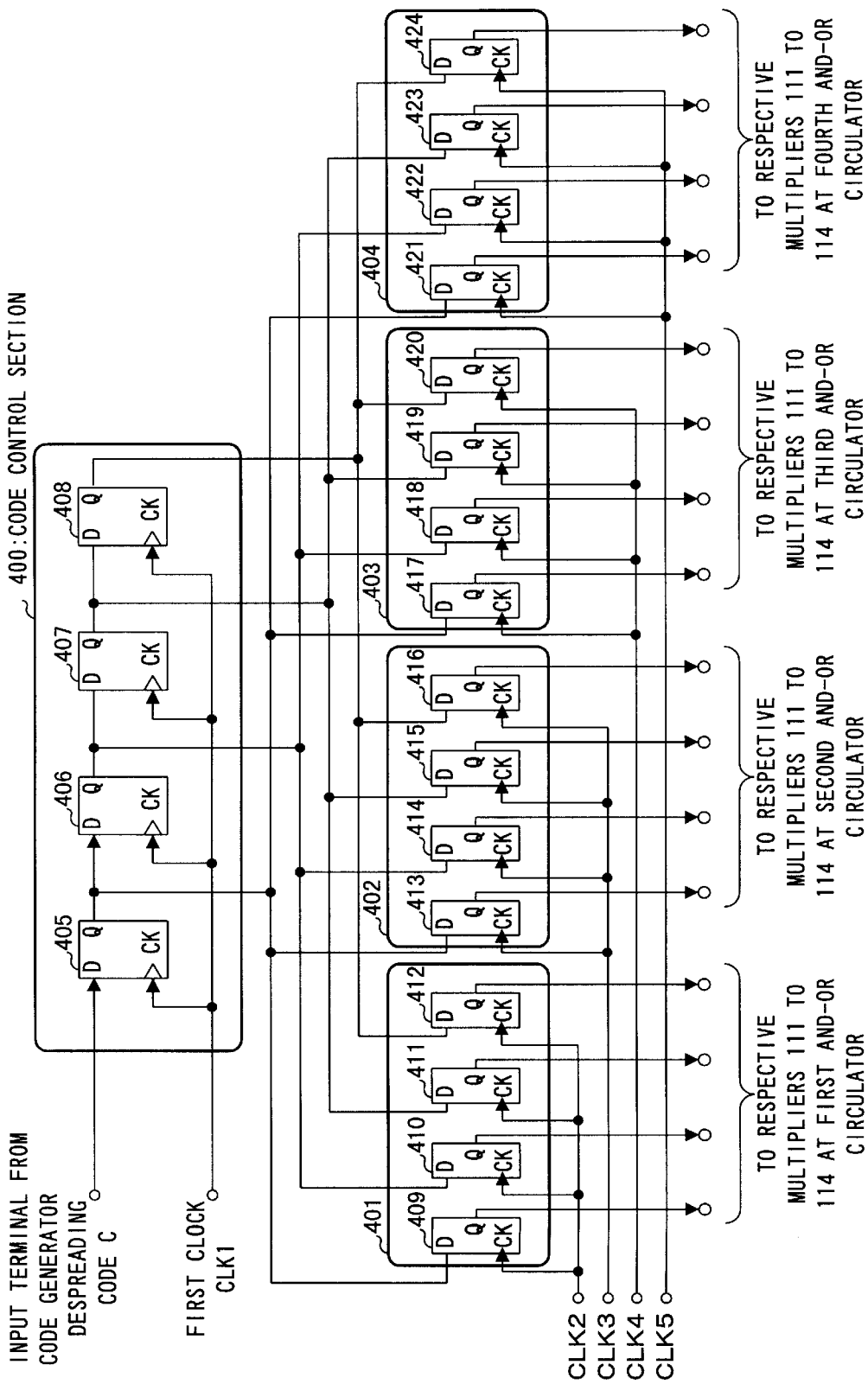
FIG. 6 is a block diagram of a code control section provided in a digital matched filter according to a second embodiment of the present invention.

FIG. 6 illustrates a configuration of code control section 400 and despreading code storage circuits 401 to 404 provided in the digital matched filter according to this embodiment. Code control section 400 is composed of a shift register with taps and first to fourth flip-flops 405 to 408. First clock CLK1 of 4,096 Mhz is input to each clock input terminal CK of first to fourth flip-flops 405 to 408 through a clock input terminal. A despreading code generated at a code generator is input to D input of first flip-flop 405 in synchronization with first clock CLK1.

Despreading code storage circuits 401 to 404 are provided in first to fourth AND-OR circulators 101 to 104. The configuration of first to fourth AND-OR circulators 101 to 104 in this embodiment is the same as AND-OR circulators 101 to 104 in the first embodiment except the configuration of despreading code storage circuits 401 to 404. Despreading code storage circuit 401 is composed of four flip-flops 409 to 412. Q input of each flip-flops 409 to 412 is coupled to respective tap output (including FF output at the last stage) of code control section 400. The other despreading code storage circuits 402 to 404 have the same configuration as storage circuit 401. Clock CLK2 to CLK5, controlled individually, are provided to respectively to despreading code storage circuits 401 to 404.

Figure 7:
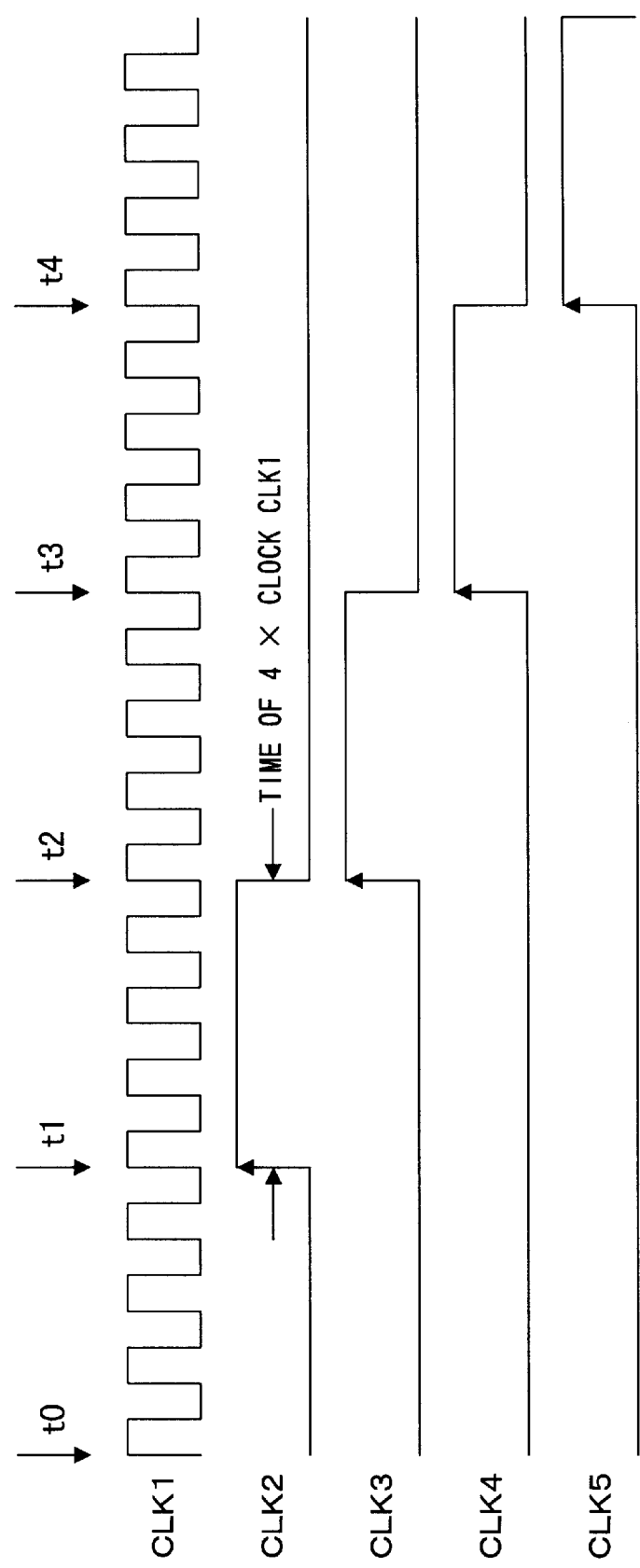
FIG. 7 is a timing diagram of the digital matched filter according to the second embodiment.

The next description is given of operations of code control section 400 and despreading code storage circuits 401 to 404 with reference to a timing diagram illustrated in FIG. 7. When clock CLK is changed from "0" to "1" at time t0, an output signal from the code generator is input to flip-flop 405, first stage of code control section 400, and held. Similarly, output signals from the code generators are input to flip-flop 405, shifted to second to fourth flip-flops 406 to 408 by time t1 from time t0 equaling to 4×first clock CLK1, and then held. At this point, a despreading code for the first symbols is held in code control section 400.

Second clock CLK2 is changed from "0" to "1" at time t1, and the despreading code for the first symbol is written to first to fourth despreading code flip-flops 409 to 412 of first despreading code storage circuit 401 then held.

Further, at time t2 after 4×first clock CLK1 passes from time t1, third clock CLK3 is changed from "0" to "1", and the despreading code for the second symbol stored in code control section 400 by first clock CLK1 until time t2 from time t1 is written to first to fourth flip-flops 413 to 416 at second despreading code storage circuit 402, then held.

Sequentially, a despreading code for the third symbol is written to first to fourth flip-flops 417 to 420 at third despreading code storage circuit 403 at time t3 then held, and a despreading code for the fourth symbol is written to first to fourth flip-flops 421 to 424 at fourth despreading code storage circuit 404 at time t4 then held.

In AND-OR calculators 101 to 104, despreading codes loaded in first to fourth despreading code storage circuits 401 to 404 are input to respective first to fourth multipliers 111 to 114.

Figure 1:
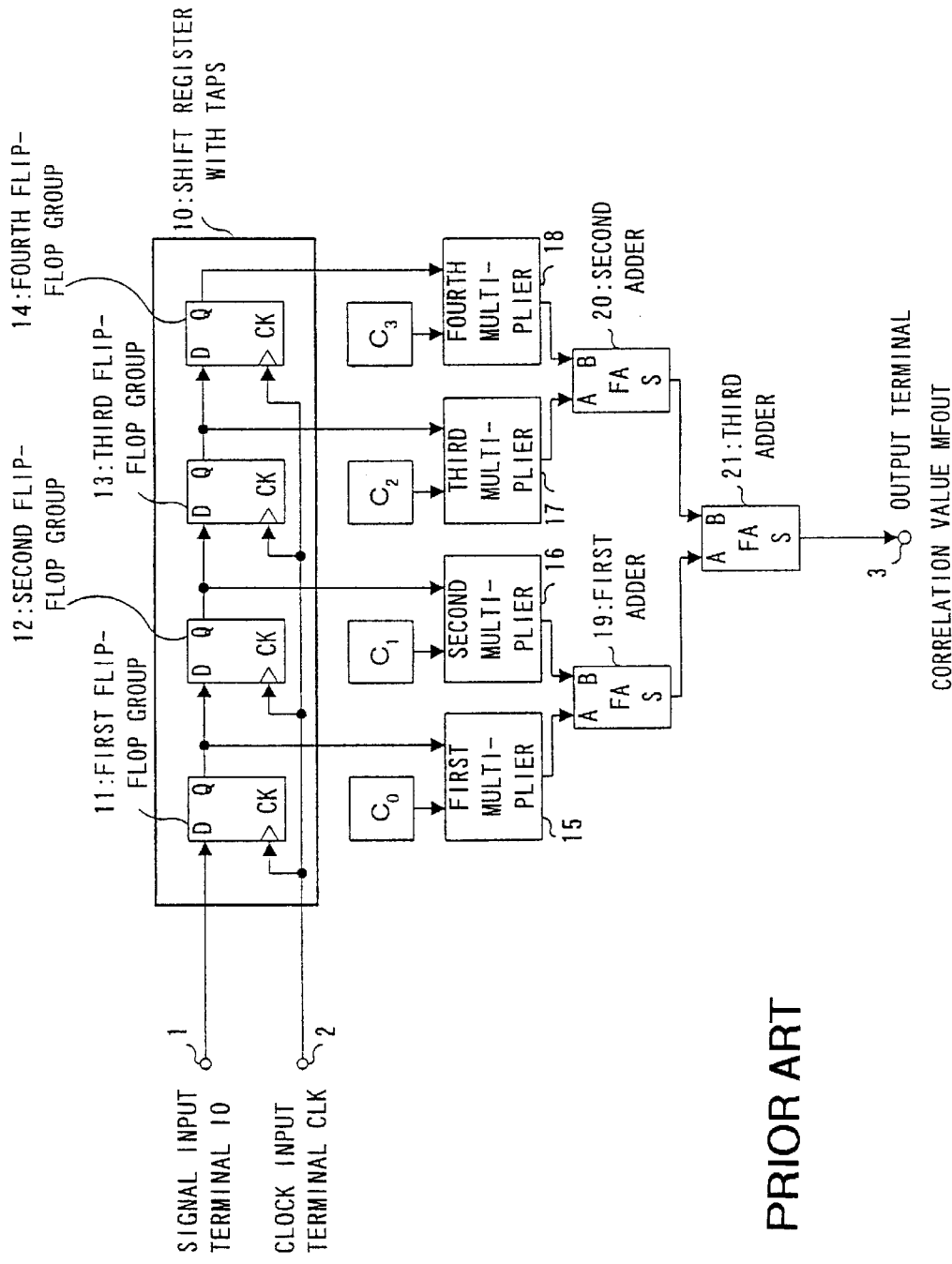
FIG. 1 is a block diagram illustrating a conventional example of a digital matched filter for spreading factor 4 composed of FIR filters.
Figure 2:
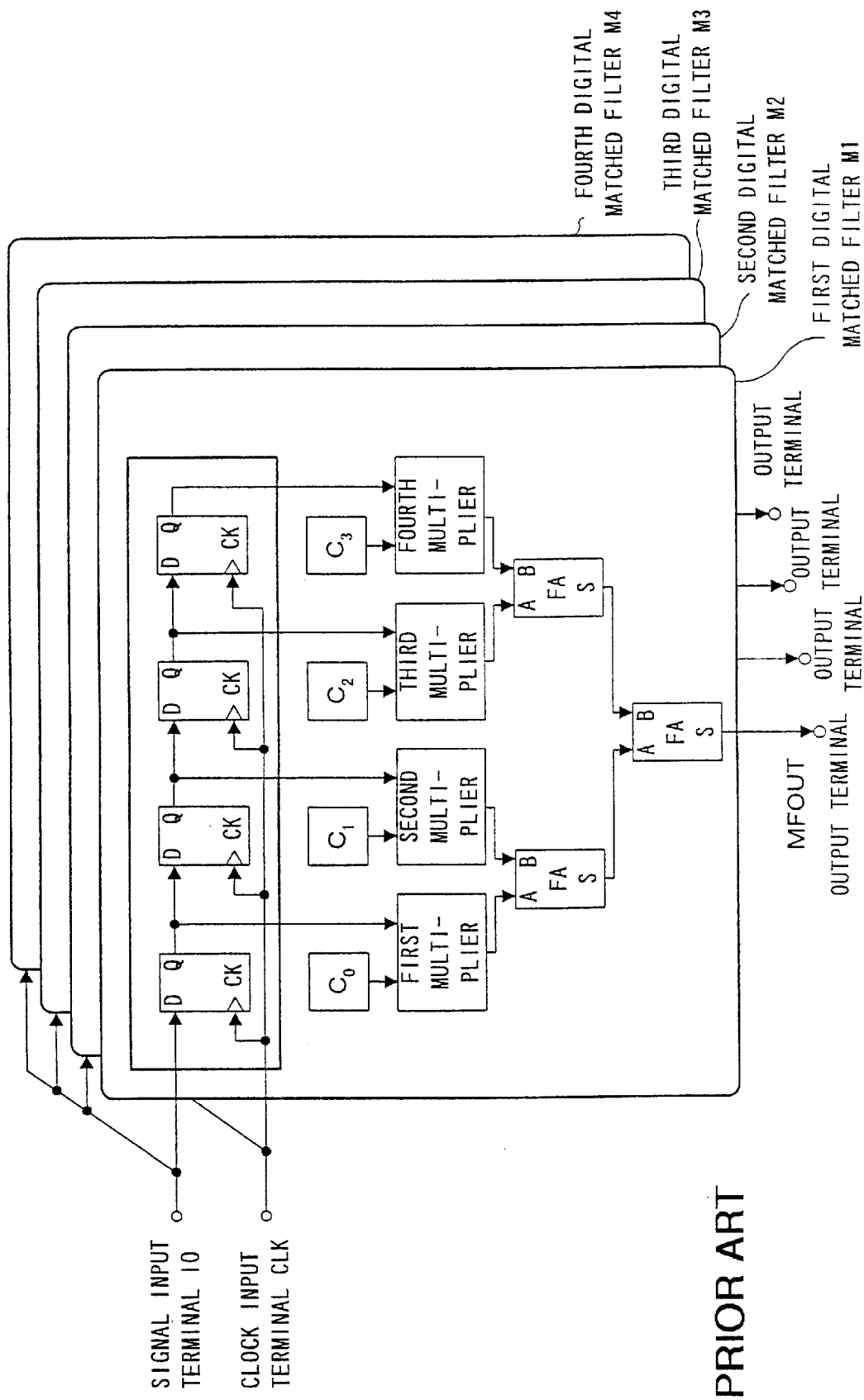
FIG. 2 is a block diagram illustrating a conventional example of using a plurality of digital matched filters arranged in parallel.

According to the second embodiment, despreading codes are loaded in first to fourth despreading code storage circuits 401 to 404 by shifting a timing on a basis of one symbol period according to clock CLK2 to CLK5 and held for four symbol periods. As a result, it is possible to rewrite codes illustrated in FIG. 2 as well as the first embodiment.

(Third Embodiment)

In a digital matched filter according to the third embodiment of the present invention, functions of the despreading code storage circuit and code control section according to the first embodiment are partially modified.

Figure 8:
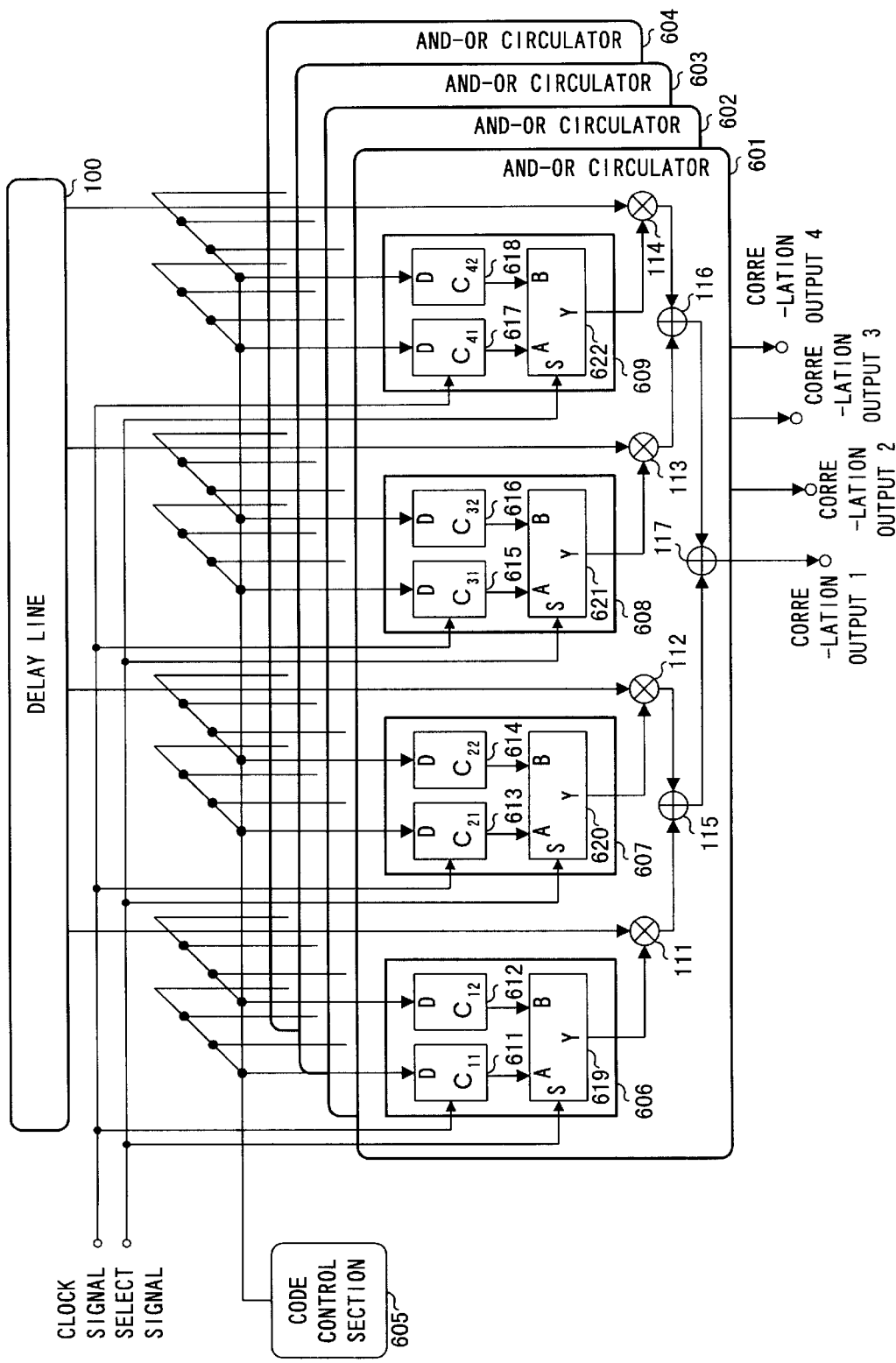
FIG. 8 is a block diagram of a digital matched filter according to a third embodiment of the present invention.

FIG. 8 illustrates a configuration of the digital matched filter according to the third embodiment. As illustrated in FIG. 8, the digital matched filter has storage section 100, first to fourth AND-OR circulators 601 to 604 and code control section 605.

First AND-OR circulator 601 has first to fourth despreading code storage circuits 606 to 609. Each of despreading code storage circuits 606 to 609 has a flip-flop provided with an odd number (611, 613, 615 or 617), another flip-flop provided with an even number (612, 614, 616 or 618) and a selector circuit (either of 619 to 622) for selecting the flip-flop of an odd number or the flip-flop of an even number. First AND-OR circuit 601 further comprises first to fourth multipliers 111 to 114 for respectively multiplying a digital signal by a despreading code held in respective despreading code storage circuits 606 to 609, and adders 115 to 117 for adding outputs from respective multipliers 111 to 114.

The following description is given of operations of the digital matched filter according to this embodiment configured as described.

Figure 9A:
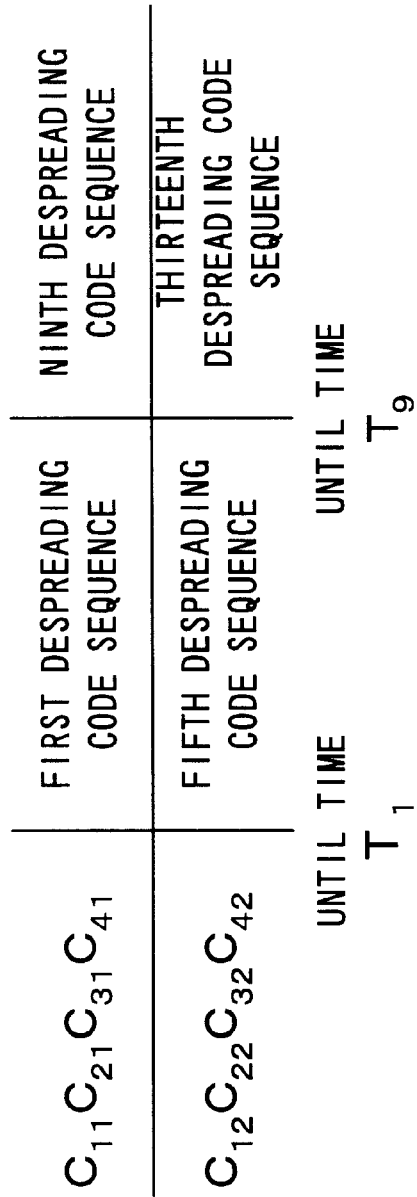
FIGS. 9A and 9B are timing diagrams illustrating a relation between load timing and despreading code sequence in the digital matched filter according to the third embodiment.

Clock CLK of 4,096 Mhz is input to clock input terminals of flip-flops 611 to 618 at first to fourth despreading code storage circuits 606 to 609, and an output signal from code control section 605 is input to D inputs of flip-flops 611 to 618 according to a timing illustrated in FIG. 9A. As a result, in despreading code storage circuits 606 to 609, the first despreading code sequence is written to the flip-flops provided with the odd number (611, 613, 615 and 617) and the fifth despreading code sequence is written to the flip-flops provided with the odd number (612, 614, 616 and 618).

Figure 9B:
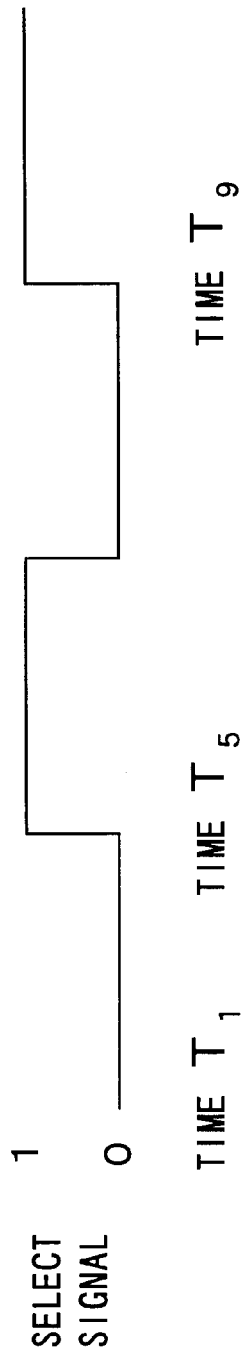

A select signal is input to each of select signal input terminals S of first to fourth selector circuits 619 to 622 through a select signal input terminal, and the select signal changes at the timing illustrated in FIG. 9B. When the select signal is "0", first to fourth selector circuits 619 to 622 select respective flip-flops provided with the odd number (611, 613, 615 and 617) at despreading code storage circuits 606 to 609, and the first despreading code sequence is input to multipliers 111 to 114. Further, when the select signal is "1", first to fourth selector circuits 619 to 622 select respective flip-flops provided with the even number (612, 614, 616 and 618) at despreading code storage circuits 606 to 609, and the fifth despreading code sequence is input to multipliers 111 to 114. The write and selection of despreading codes described above are executed in AND-OR circulators 601 to 604 in order to achieve the rewrite of despreading codes as illustrated in FIG. 4.

According to the third embodiment, despreading code storage circuits 606 to 609 each has two flip-flops, to which different despreading codes (the shift corresponds to four symbols in this embodiment) are written in advance, and first to fourth selector circuits 619 to 622 are controlled to achieve the rewrite of despreading codes illustrated in FIG. 4, enabling a code rewrite to be executed not depending on a timing of code control section 605.

(Fourth Embodiment)

Figure 10:
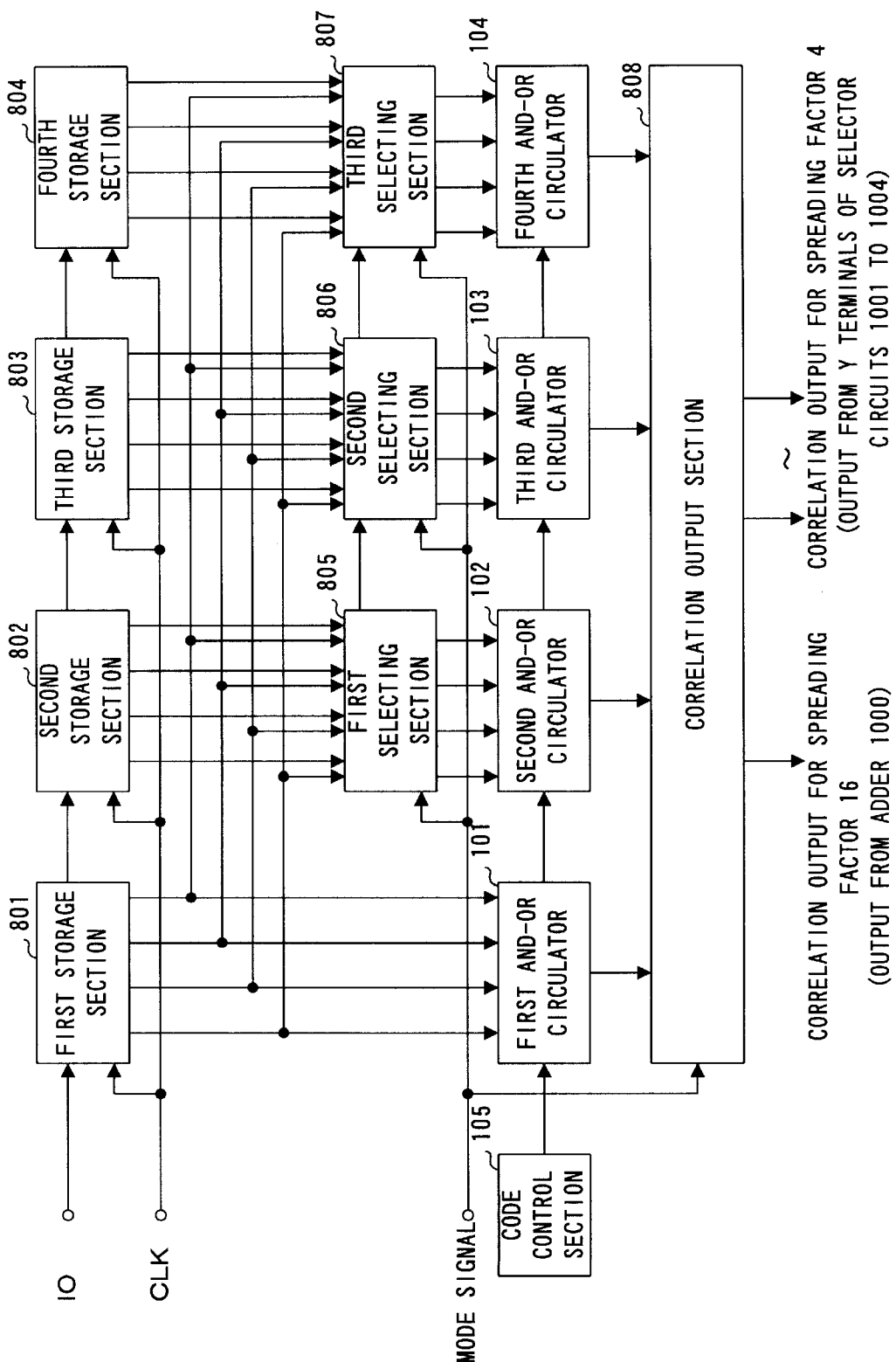
FIG. 10 is a block diagram of a digital matched filter according to a fourth embodiment of the present invention.

FIG. 10 illustrates a configuration of a digital matched filter according to the fourth embodiment of the present invention. The sections provided with the same functions as the first embodiment have the same numerical symbols.

The digital matched filter according to this embodiment has first to fourth storage sections 801 to 804 capable of storing symbol data with spreading factor 4, first to third selecting section 805 to 807 provided corresponding to second to fourth storage sections 802 to 804, first to fourth AND-OR circulators 101 to 104, correlation output section 808, and code control section 105.

First to fourth storage sections 801 to 804 are composed of four connected shift registers with the same configuration. Each storage section is composed of the shift register having four serially connected flip-flops and four taps.

Figure 11:
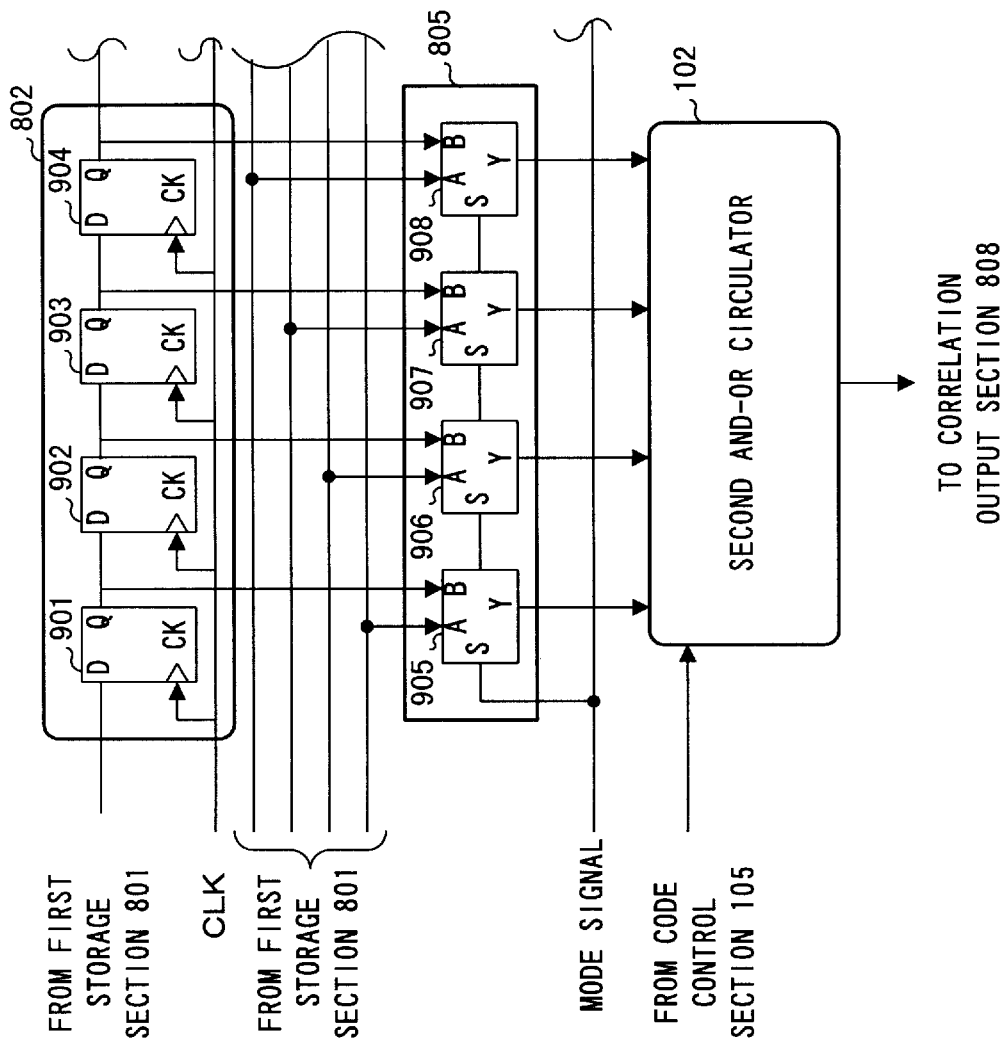
FIG. 11 is a diagram illustrating a part of the digital matched filter according to the fourth embodiment.

FIG. 11 illustrates a circuit diagram including second storage section 802 and first selecting section 805. Second storage section 802 is composed of flip-flops 901 to 904. First selecting section 805 is composed of four selector circuits 905 to 908. A mode signal is input to each of selector circuits 905 to 908. The mode signal is common to each selector circuit and indicates either of four symbols waiting mode for spreading factor 4 or symbol correlation mode for spreading factor 16. Selector circuits 905 to 908 each receives symbol data output from respective tap of first storage section 801 and another symbol data output from respective tap of second storage section 802. Outputs from selector circuits 905 to 908 are input to AND-OR circuit 102.

First, third and fourth storage sections 801, 803 and 804 have the same configuration as second storage section 802. Second and third selecting section 806 and 807 have the same configuration as first selecting section 805. Second selecting section 806 selects an output from first storage section 801 or third storage section 803, and third selecting section 807 selects an output from first storage section 801 or fourth storage section 804.

Figure 12:
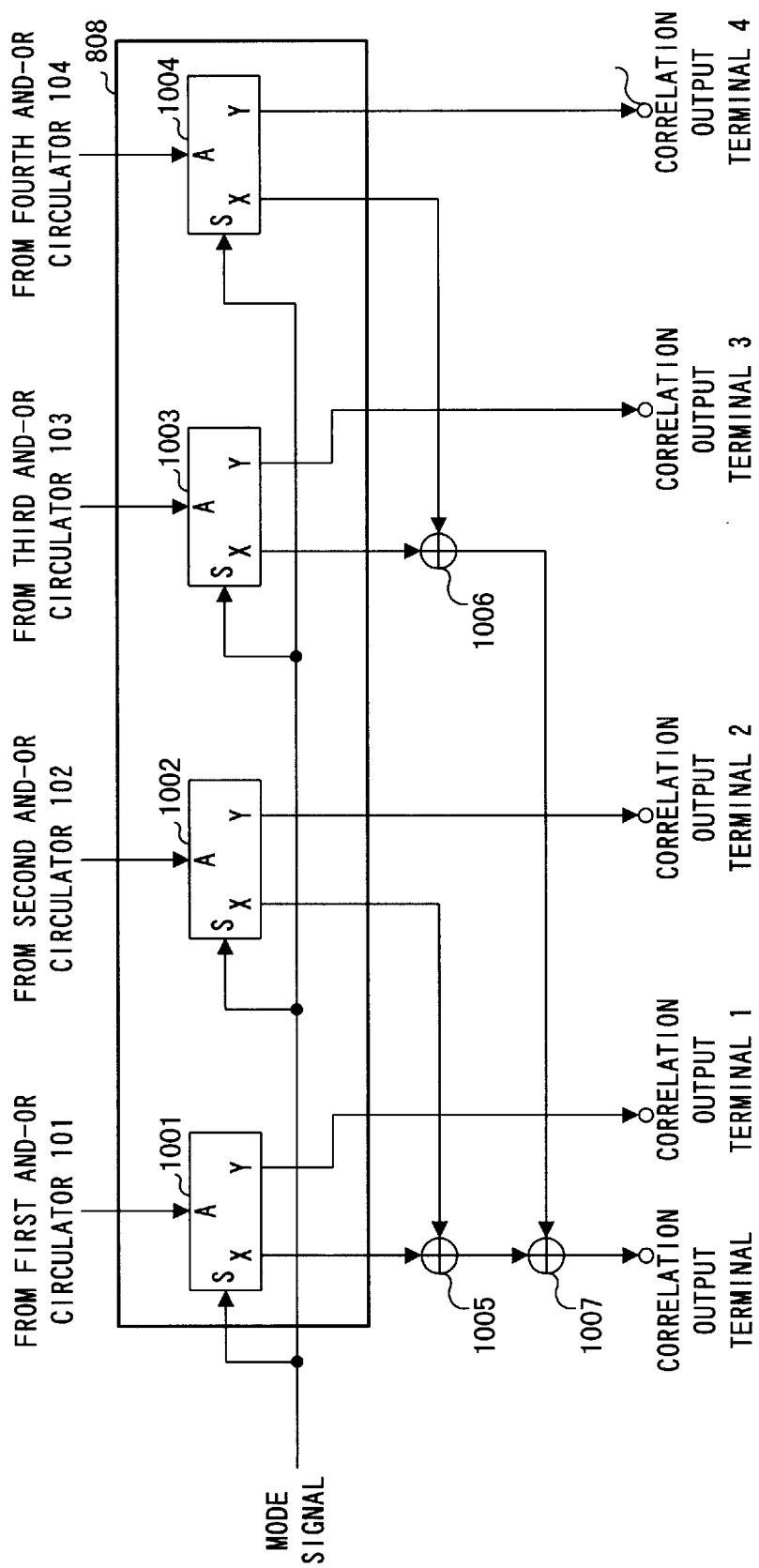
FIG. 12 is a diagram of a configuration of a correlation output section of the digital matched filter according to the fourth embodiment.

FIG. 12 illustrates a configuration of correlation output section 808. Correlation output section 808 has four selector circuits 1001 to 1004 corresponding to first to fourth AND-OR circulators. Each of selector circuits 1001 to 1004 is composed of a selector circuit with one input terminal and two output terminals, and switches between output terminals x and Y according to the mode signal to connect to input terminal A. Output signals from terminals X of selectors 1001 and 1002 are input to adder 1005, output signals from terminals Y of selector circuits 1003 and 1004 are input to adder 1006, and output signals from adder 1005 and adder 1006 are input to adder 1007. Output signals from Y terminals of selector circuits 1001 to 1004 are correlation outputs in the four symbols waiting mode for spreading factor 4, and an output signal from adder 1007 is correlation output in the symbol correlation mode for spreading factor 16.

Operations of the digital matched filter configured as described above will be described.

As well as the first embodiment, in the case of four symbols waiting mode for spreading factor 4, the mode signal is set at "0". When the mode signal is "0", input terminals A are selected at selector circuits 905 to 908 in first to third selecting sections 805 to 807, and output terminals Y are selected at selector circuits 1001 to 1004 in correlation output sections 808. As a result, data to be written to first storage section 801 are input to first to fourth AND-OR circulators 101 to 104 in parallel through first to third selecting sections 805 to 807. Different despreading code sequences are input to first to fourth AND-OR circulators 101 to 104 from code control section 105 and held for a delayed wave waiting period (four symbol periods). In other words, in the case where the mode signal is "0", the configuration in this embodiment is the same as that in the first embodiment, resulting in the same operation.

When the mode signal is "1", input terminals B are selected in first to third selecting sections 805 to 807, and output terminals X are selected in selector circuits 1001 to 1004 in correlation output section 808.

At this point, digital signal IO is input to data input terminals D of respective flip-flops composing first to fourth storage sections 801 to 804. Accordingly, when "1" (high level in logical value) is input to first to sixteenth clock input terminals CK in storage sections in synchronization with clock CLK, digital signal IO is input to first to fifteenth flip-flops in synchronization with clock CLK to be held.

The held data is input to first to fourth AND-OR circulators 101 to 104 and subjected to the processing described in the first embodiment in respective AND-OR circulators with the despreading code sequences beforehand stored in the despreading code storage sections. The calculation results are input to adders 1005 and 1006 from first to fourth AND-OR circulators 101 to 104 through selector circuits 1001 to 1004 in correlation output section 808. Adder 1005 adds the output signal from first selector circuit 1001 (M+2 bits) to the output signal from second selector circuit 1002 (M+2 bits). Adder 1006 adds the output signal from third selector circuit 1003 (M+2 bits) to the output signal from fourth selector circuit 1004 (M+2 bits). Adder 1007 adds the output signal from adder 1005 (M+3 bits) to the output signal from adder 1006 (M+3 bits). As a result, the correlation value MFOUT of digital signal IO with the despreading code (C15C14C13C12C11C10C9C8C7C6C5C4C3C2C1C0) is obtained at adder 1007 as the last stage.

According to the configuration of the fourth embodiment as described above, since the digital signal storage sections and selecting circuits are provided to the digital matched filter of the first embodiment, it is possible to use both four symbols waiting mode for spreading factor 4 and symbol correlation mode for spreading factor 16 in the same hardware by switching according to the mode switching signal.

(Fifth Embodiment)

In a digital matched filter according to the fifth embodiment of the present invention, a basic configuration is the same as the first embodiment, and the configurations of the code control section and AND-OR circulators are partially different. In addition, the same function sections as the first, second and fourth embodiments have the same numeral symbols as those embodiments.

Figure 13:
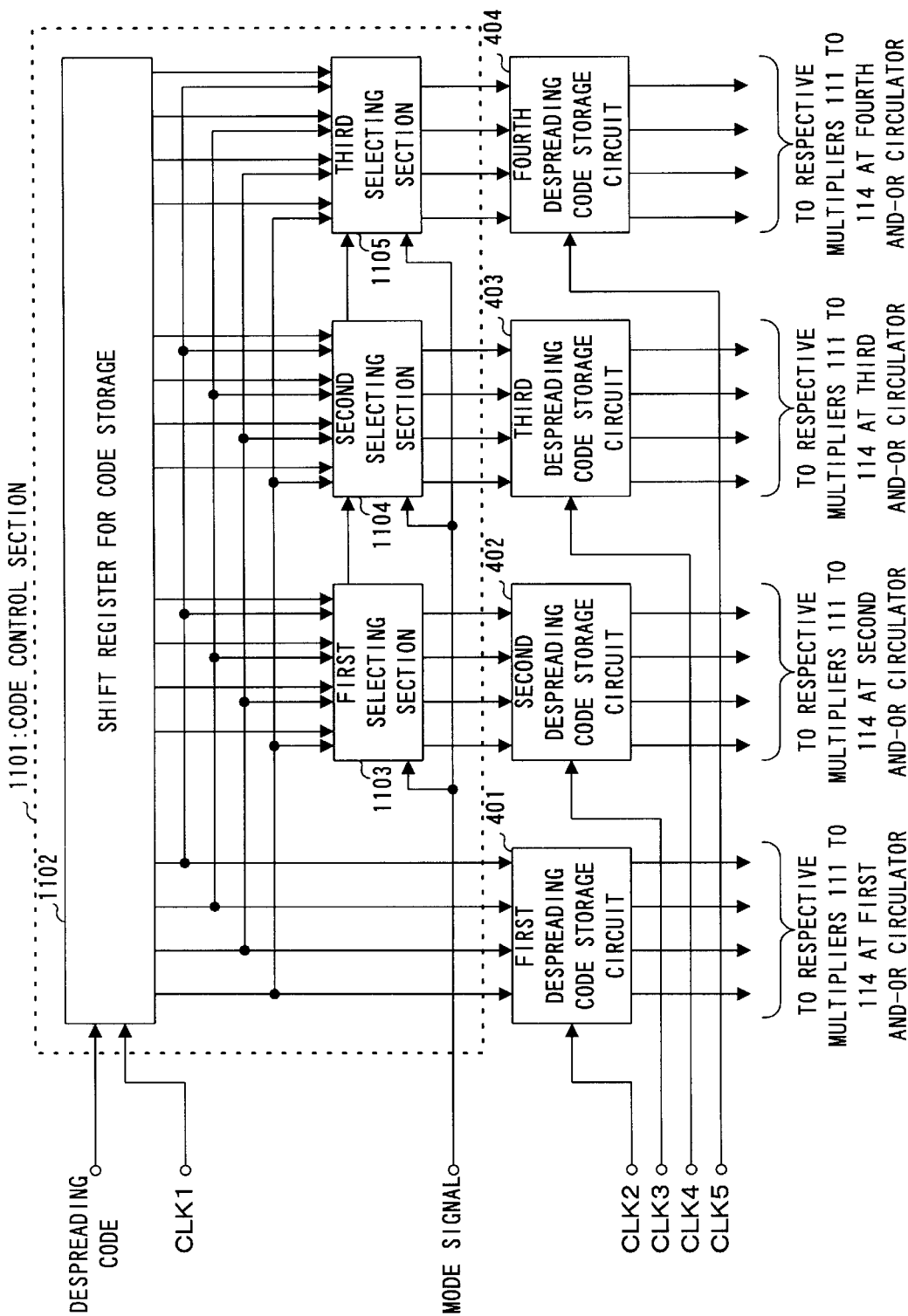
FIG. 13 is a block diagram of a code control section of a digital matched filter according to a fifth embodiment of the present invention.

FIG. 13 illustrates partial configurations of the code control section and AND-OR circulator. Code control section 1101 has shift register 1102 for code storage composed of sixteen serially connected flip-flops and sixteen taps and first to third selecting sections 1103 to 1105. With respect to output signals from shift register 1102 for code storage, the outputs from first to fourth taps are input to first to third selecting sections 1103 to 1105 in parallel, while the outputs from fifth to eighth taps are input to first selecting section 1103, the outputs from ninth to twelfth are input to second selecting circuit 1104, and the outputs from thirteenth to fifteenth are input to third selecting section 1105.

Figure 14:
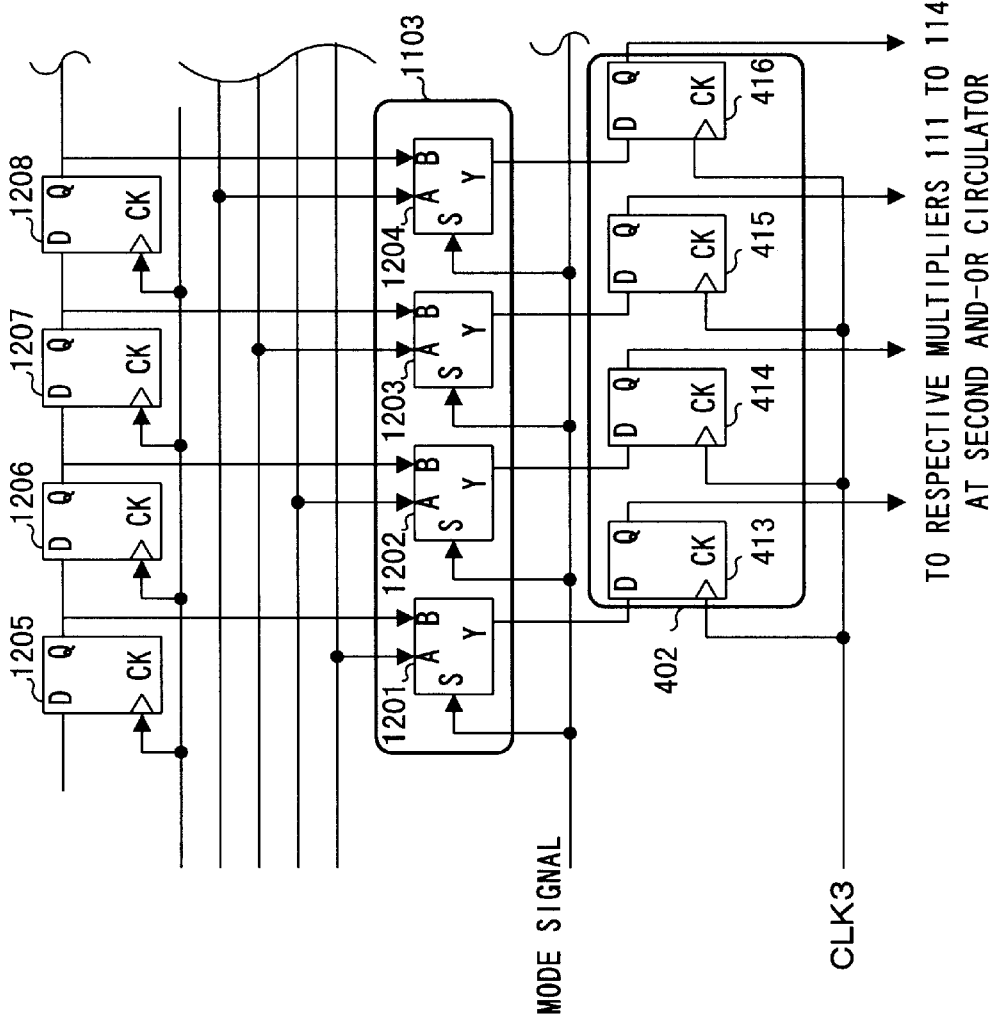
FIG. 14 is a diagram illustrating a part of the code control section illustrated in FIG. 13.

FIG. 14 illustrates first selecting section 1103 included in code control section 1101, flip-flops of shift register 1102 for code storage for providing a signal to input terminals A of first selecting section 1103, and second despreading code storage circuit 402 to which the outputs from output terminals Y are input through input terminals D. First selecting section 1103 has four selector circuits 1201 to 1204. Selector circuits 1201 to 1204 receive through input terminals B respectively the outputs from first to fourth taps of shift register 1102 for code storage and receive through input terminals A despreading code respectively from flip-flops 1205 to 1208 of shift register 1102 for code storage as tap outputs. Selector circuits 1201 to 1204 composing first selecting section 1103 select either of signals from input terminals A or B according to a mode signal. FIG. 14 illustrates first selecting section 1103, and second and third selecting sections 1104 and 1105 are configured in the same way as first selecting section 1103.

The following description is given of operations of the digital matched filter having the code control section 1101 configured as described above.

A despreading code is input to the code input terminal of shift register 1102 for code storage in synchronization with first clock CLK1. In addition, the despreading code signal is a digital signal of 1 bit synchronized with first clock CLK1 of 4,096 Mhz. The outputs from first to fourth taps of shift register 1102 for code storage are input to first despreading code storage circuit 401, while input to input terminals B of selector circuits at first to third selecting sections 1103 to 1105. The despreading code transferred in shift register 1102 for code storage are respectively input to terminals A of selector circuits at the selecting sections as outputs from every four taps of shift register 1102 for code storage, i.e., fifth to eighth taps, ninth to twelfth taps, and thirteenth to sixteenth taps.

The mode signals are input to selecting terminals S of selector circuits included in first to third selecting sections 1103 to 1105. In the selector circuits, input terminals A are selected when the mode signal is "0", and input terminals B are selected when the mode signal is "1". Accordingly, when the mode signal is "0", the outputs from first to fourth taps of shift register 1102 for code storage are input to first to fourth despreading code storage circuits 401 to 404 through first to third selecting sections 1103 to 1105. On the other hand, when the mode signal is "1", the outputs from every four taps of first to sixteenth taps of shift register 1102 for code storage are respectively input to first to fourth despreading code storage circuits 401 to 404 through first to third selecting sections 1103 to 1105.

First to fourth despreading code storage circuits 401 to 404 respectively receive clocks CLK2, CLK3, CLK4 and CLK5 illustrated in FIG. 7 in the same way as the second embodiment.

In first despreading code storage circuit 401, second clocks CLK2 are input to clock input terminals CK of first to fourth flip-flops 409 to 412, and the outputs from first to fourth taps of shift register 1102 for code storage are directly input to first to fourth flip-flops 409 to 412 as the despreading code in synchronization with second clock CLK2.

In second despreading code storage circuit 402, third clocks CLK3 are input to clock input terminals CK of first to fourth flip-flops 413 to 416, and the outputs from first to fourth taps or fifth to eighth taps of shift register 1102 for code storage are input to first to fourth flip-flops 413 to 416 in synchronization with third clock CLK3 as the despreading code through first selecting section 1103.

In third despreading code storage circuit 403, fourth clocks CLK4 are input to clock input terminals CK of first to fourth flip-flops 417 to 420, and the signals output from first to fourth taps or ninth to twelfth taps of shift register 1102 for code storage are input to first to fourth flip-flops 417 to 420 in synchronization with fourth clock CLK4 as the despreading code through second selecting section 1104.

In fourth despreading code storage circuit 404, fifth clocks CLK5 are input to clock input terminals CK of first to fourth flip-flops 421 to 424, and the outputs from first to fourth taps or thirteenth to sixteenth taps of shift register 1102 for code storage are input to first to fourth flip-flops 421 to 424 in synchronization with fifth clock CLK5 as the despreading code through third selecting section 1105.

In code control section 1102 according to this embodiment configured as described above, when the mode signal is "1", the mode is set at symbol correlation mode for spreading factor 16. In this mode, when sixteen first clocks CLK1 are input after the initial state, sixteen chips of despreading code C1 are written to first to sixteenth flip-flops composing shift register 1102 for code storage, while despreading codes C15 to C0 are held in flip-flops of despreading code storage circuits 401 to 404.

When the mode signal is "0", the mode is set at four symbols waiting mode for spreading factor 4. In this mode, when four first clocks CLK1 are input after the initial state, four chips of despreading code C1 are written to first to fourth flip-flops composing shift register 1102 for code storage, while despreading codes C43 to C40 are held in flip-flops 409 to 412 of first despreading code storage circuit 401 in synchronization with second clock CLK2. When four first clocks CLK1 are further input, four chips of despreading code C1 for next symbol are input to flip-flops 15 to 18 composing shift register 1102 for code storage, while despreading codes C33 to C30 are held in flop-flops 413 to 416 at second despreading code storage circuit 402 in synchronization with third clock CLK3. When four first clocks CLK1 are further input, four chips of despreading code C1 for further next symbol are input to ninth to twelfth flip-flops composing shift register 1102 for code storage, while despreading codes C23 to C20 are held in flip-flops 417 to 420 of third despreading code storage circuit 403 in synchronization with fourth clock CLK4.

When four first clocks CLK1 are further input, four chips of despreading code C1 for next symbol are input to thirteenth to sixteenth flip-flops composing shift register 1102 for code storage, while despreading codes C03 to C00 are held in flip-flops 421 to 424 of fourth despreading code storage circuit 404 in synchronization with fourth clock CLK5. It is thus possible to rewrite the despreading code as illustrated in FIG. 4.

As described above, according to the fifth embodiment, it is possible to use the same circuit configuration for the delayed wave waiting mode and the correlation detection mode of symbols with different spreading factor by switching between those modes.

(Sixth Embodiment)

The sixth embodiment of the present invention adds another processing to the fifth embodiment, where the operations of flip-flops which are not used in the four symbols waiting mode for spreading factor 4, i.e., fifth to sixteen flip-flops of shift register 1102 for code storage and flip-flops of second to fourth storage sections 802 to 808, are stopped.

Figure 15:
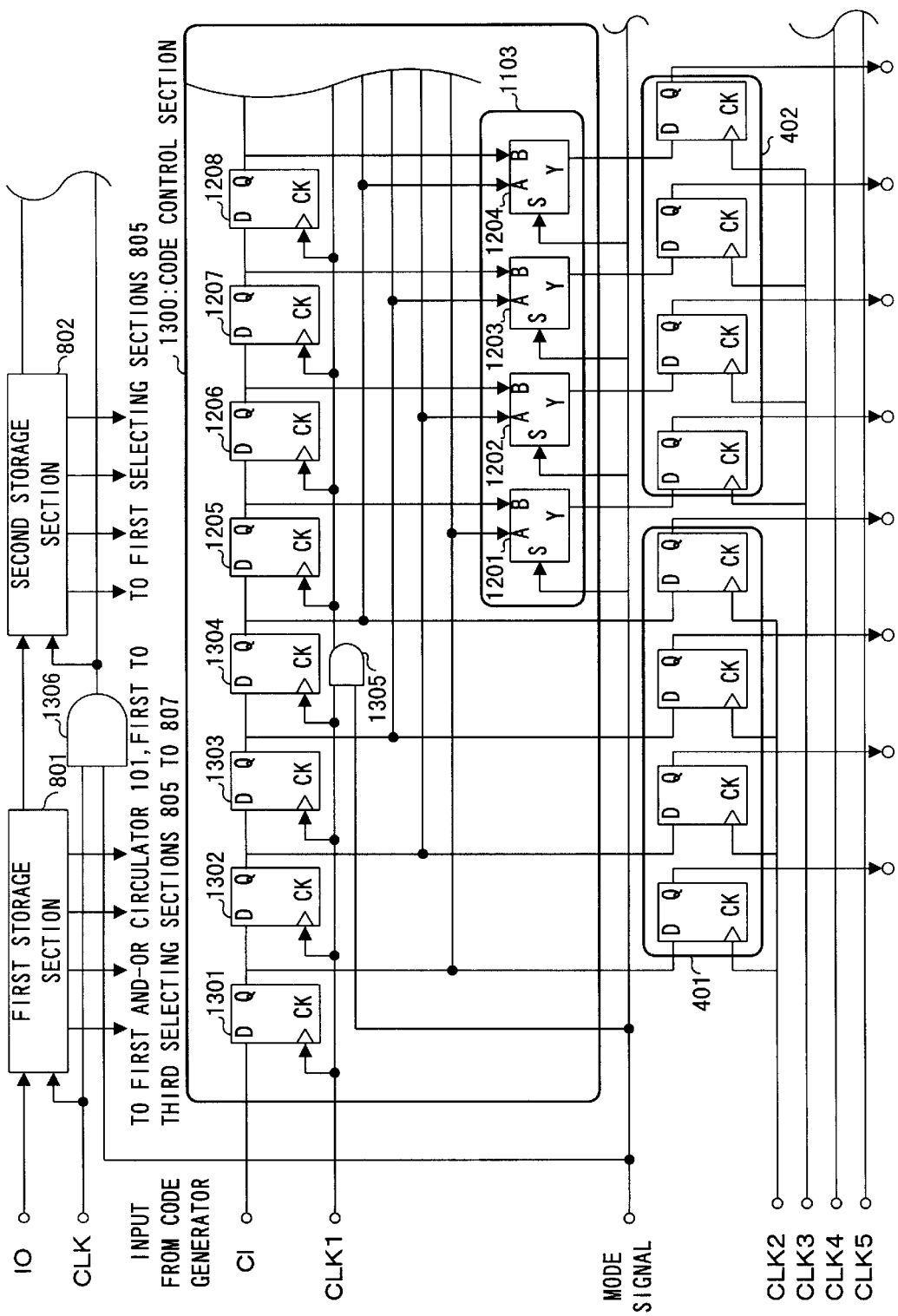
FIG. 15 is a block diagram of a code control section and a data storage section of a digital matched filter according to a sixth embodiment of the present invention.

FIG. 15 illustrates a configuration of the principal section of the digital matched filter according to the sixth embodiment. The basic configuration of the digital matched filter is the same as the fifth embodiment illustrated in FIG. 10 to FIG. 14, and the same sections have the same numerical symbols.

The digital matched filter according to this embodiment provides code control section 1300 having first to sixteenth flip-flops with a function of stopping flip-flop operation corresponding to the mode. Code control section 1300 has shift register 1102 for code storage having serially connected first to sixteenth flip-flops and sixteen taps, and first to third selecting sections 1103 to 1105. Further, AND circuit 1305 for power control is inserted to a line for supplying clock CLK1 to fifth to sixteenth flip-flops composing shift register 1102 for code storage. AND circuit 1305 for power control receives first clock CLK1 through a first input terminal and the mode signal through a second input terminal, and outputs the resultant AND signal to input to clock input terminals CK of fifth to sixteenth flip-flops.

Further, AND circuit 1306 for power control is inserted to a line for supplying clock CLK to each flip-flop of second to fourth storage sections 802 to 804. AND circuit 1306 for power control receives clock CLK through a first input terminal and the mode signal through a second input terminal, and outputs the resultant AND signal to input to each of clock input terminals CK of flip-flops of second to fourth storage sections 802 to 804.

The other configuration is the same as the fifth embodiment.

The following description is given of operations in the digital matched filter according to the sixth embodiment configured as described above.

AND circuit 1305 for power control in the code control section side receives first clock CLK through the first input terminal and the mode signal through the second input terminal. Further, AND circuit 1306 for power control in storage section side receives clock CLK through the first input terminal and the mode signal through the second input terminal.

In this embodiment, it is assumed that "1" of mode signal indicates the symbol correlation mode for spreading factor 16 and "0" of mode signal indicates the four symbols waiting mode for spreading factor 4.

Assume that "0" of mode signal indicative of four symbols waiting mode for spreading factor 4 is input at this point. When the mode signal is "0", AND circuits 1305 and 1306 for power control output "0", clocks for operation (CLK1 and CLK) are not supplied to fifth to sixteenth flip-flops and second to fourth storage sections. As a result, second to fourth storage sections 802 to 804 and fifth to sixteenth flip-flops at shift register 1102 for code storage do not operate during the four symbols waiting mode for spreading factor 4.

On the other hand, in the case where the mode signal of "1", indicative of symbol correlation mode for spreading factor 16, is input, AND circuits 1305 and 1306 for power control output first clock CLK1 and clock CLK, and input clock CLK1 to first to sixteenth flip-flops and clock CLK to first to fourth storage sections 802 to 804.

As described above, according to the sixth embodiment, it is possible during the four symbols waiting mode for spreading factor 4 to stop first to fourth storage sections 802 to 804 and fifth to sixteenth flip-flops which are not used in this mode, thus resulting in power saving.

(Seventh Embodiment)

Figure 16:
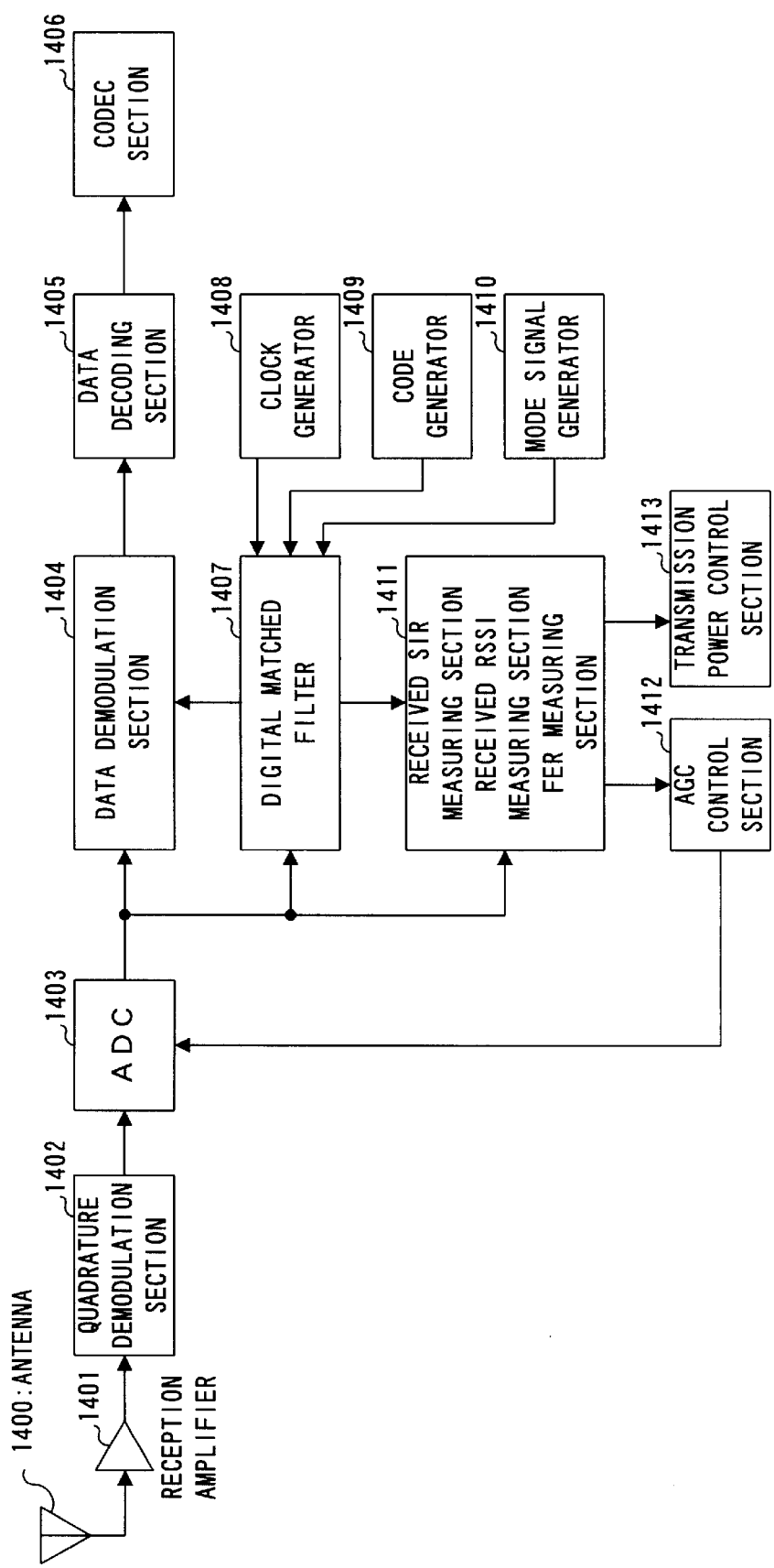
FIG. 16 is a block diagram of a CDMA receiving apparatus according to a seventh embodiment of the present invention.

FIG. 16 illustrates a schematic diagram of a CDMA receiving apparatus according to the seventh embodiment. The seventh embodiment will illustrate an example to apply the digital matched filter described in the fifth embodiment to the CDMA receiving apparatus.

In this CDMA receiving apparatus, a signal received at antenna 1400 is amplified at reception amplifier 1401, and the resultant signal is input to quadrature demodulation section 1402. The Ich and Qch signals are subjected to quadrature conversion to obtain a demodulated received signal at quadrature demodulation section 1402. The demodulated received signal is subjected to sampling and gain control at AD conversion section 1403 and then input to data demodulation section 1404. Data demodulation section 1404 multiplies the received spread spectrum signal by despreading code for data demodulation. The data output from data demodulation section 1404 is input to data decoding section 1405 to decode. The decoded data is input to CODEC section 1406 to be subjected to codec processing.

Digital matched filter 1407 acquires the timing for use in despreading for data demodulation at data demodulation section 1404. Digital matched filter 1407 is the digital filter described in the fifth embodiment. Digital matched filter 1407 receives one or more necessary clocks input from clock generator 1408, the despreading code input from code generator 1409, and the mode signal input from mode signal generator 1410. The detailed operations of digital matched filter 1407 are as described previously.

Further, measuring section 1411 measures SIR, RSSI and FER from a received signal. AGC control section 1412 determines a gain control amount for use in AD conversion section 1403 using the measurement result by measurement section 1411 to output to AD conversion section 1403. 1413 determines the transmission power from the measurement result by the measuring section 1411 so as to output to a transmission section side.

As described above, it is possible to miniaturize a circuit scale and reduce power consumption of a CDMA receiving apparatus by providing the CDMA receiving apparatus in a CDMA communication system with the digital matched filter described in fifth embodiment.

Further, the seventh embodiment describes about the case of using the digital matched filter described in the fifth embodiment in a CDMA receiving apparatus. However, it is preferable to apply the digital matched filters described in the other embodiments in the same way.

Furthermore, it is also preferable to install either of matched filters described in the first to sixth embodiments in a radio receiving section of a base station apparatus of mobile station apparatus which performs mobile radio communications in the CDMA system. It is further preferable to use either of matched filters described in the first to sixth embodiments as a radio receiving apparatus of the other communication terminals.

As described above, according to the present invention, it is possible to provide correlation detection apparatus capable of performing correlation detection of delayed waves arriving after one symbol period passes and decreasing a circuit scale and power consumption.

The present invention is not limited to the above described embodiments, and various variations and modifications may be possible without departing from the scope of the present invention.

This application is based on the Japanese Patent Application No. HEI 10-202368 filed on Jul. 16, 1998, entire content of which is expressly incorporated by reference herein.

What is claimed is:

1. An apparatus for obtaining correlation by despreading a spread symbol with a spreading code:

symbol storage for storing symbol data varying at a predetermined rate;

a plurality of correlation calculators each of which executes a correlation calculation to obtain correlation by despreading said symbol data with a spreading code; and a code controller for switching a spreading code to be provided to each of said plurality of correlation calculators individually so that each of said plurality of correlation calculators executes correlation calculation with a respective different spreading code and holds a same spreading code until correlation calculations of a plurality of symbols are finished.

2. The apparatus according to claim 1, wherein said code controller comprising:
 a shift register having a plurality of taps for outputting in parallel a plurality of data items composing said spreading code varying at the predetermined rate; and
 a plurality of code storage each for receiving the spreading code output from said shift register to output to a corresponding correlation calculator during a period that an individually provided hold signal is active, wherein each hold signal is active in order over one symbol period.

3. The apparatus according to claim 1,
said correlation calculator comprising:
 a plurality of code storage to each of which one of a plurality of types of spreading codes is written individually; and
 a selector for selecting one of code storage holding a spreading code to be used among from said plurality of code storage.

4. The apparatus according to claim 3, wherein in said code controller, a write operation of spreading code to said correlation calculator and a switching operation of spreading code to be used in correlation calculation in said correlation calculator are executed asynchronously.

5. The apparatus according to claim 1, further comprising;
 a mode selector for selecting a first mode to execute correlation calculation of a plurality of symbols with a same spreading code in said correlation calculator, and a second mode to execute correlation calculation of an other symbol data spread with an other spreading code with spreading factor that is N times that of the spreading code of said symbol data in said plurality of correlation calculators;
 an adder for obtaining correlation of said other symbol data by adding calculation results obtained in said plurality of correlation calculators in the second mode; and wherein
  said symbol storage comprising a plurality of shift registers, divided by a data length of said symbol data, serially connected;
  said plurality of correlation calculators each receiving symbol data held in a shift register in said first mode, and an other symbol data from a corresponding shift register in said second mode;
  said code controller inputs a spreading code of a spreading factor matched with the spreading factor for said other symbol data to said correlation calculators in said second mode.

6. The apparatus according to claim 5, wherein said code controller comprising:
 a shift register composed of flip-flops for concurrently generating a spreading code of a spreading factor matched with the spreading factor for said other symbol data;
 a selector for receiving a spreading code of a spreading factor matched with the spreading factor for said symbol data in said first mode from said shift register to input to said plurality of correlation calculators, and the spreading code of the spreading factor matched with the spreading factor for said other symbol data in said second mode; and
 each of said correlation calculators reads the spreading code input from said shift register individually.

7. The apparatus according to claim 6, wherein in a case of said first mode, said apparatus stops operations of flip-flops except flip-flops outputting the spreading code of the spreading factor matched with the spreading factor for said symbol data at said plurality of correlation calculators.

8. A radio communication apparatus for performing radio communications in a CDMA system, said apparatus provided with a digital matched filter composed of an apparatus according to claim 1, for detecting correlation of a spread spectrum signal received from an other communication station with a spreading code using said digital matched filter.

9. A method of obtaining correlation by despreading a spread symbol with a spreading code, comprising:
 storing symbol data varying at a predetermined rate;
 executing a correlation calculation to obtain correlation by despreading said symbol data with a spreading code parallel in a plurality of correlation calculators; and
 switching a spreading code to be provided to each of said plurality of correlation calculators individually so that each of said plurality of correlation calculators executes correlation calculation with a respective different spreading code and holds a same spreading code until correlation calculations of a plurality of symbols are finished.

* * * * *